United States Patent [19]

Mariani

[11] Patent Number: 5,355,506
[45] Date of Patent: Oct. 11, 1994

[54] COMMUNICATION METHOD FOR CONTROLLING AND MONITORING ROBOTIC ENTITIES

[75] Inventor: Daniele Mariani, Sterling Heights, Mich.

[73] Assignee: The United States of America as represented by the Secretary of the Army, Washington, D.C.

[21] Appl. No.: 695,147

[22] Filed: Apr. 29, 1991

[51] Int. Cl.[5] ............... G06F 13/362; G06F 13/42; G06F 15/18; G06F 15/50

[52] U.S. Cl. ................. 395/800; 364/222.2; 364/228; 364/230.5; 364/240.9; 364/242.5; 364/261.1; 364/275.3; 364/275.4; 364/277; 364/274.1; 364/284.3; 364/DIG. 1; 364/DIG. 2

[58] Field of Search ............... 395/800, 550, 500, 200, 395/325, 375, 650, 700, 775, 725, 82, 80, 83, 84, 92, 62; 364/424.01, 423, 424.1, DIG. 1, DIG. 2, 478, 479; 370/85.1; 340/825.44

[56] References Cited

U.S. PATENT DOCUMENTS

| | | | |
|---|---|---|---|
| 4,638,445 | 1/1987 | Mattaboni | 364/42.01 |
| 4,712,184 | 12/1987 | Hamserud | 364/424.01 |
| 4,804,950 | 2/1989 | Moon et al. | 340/715 |
| 4,969,146 | 11/1990 | Twitty et al. | 370/85.1 |
| 5,008,834 | 4/1991 | Mizuno et al. | 395/80 |
| 5,084,826 | 1/1992 | Hariki et al. | 395/80 |
| 5,119,104 | 6/1992 | Heller | 342/450 |
| 5,166,872 | 11/1992 | Weaver et al. | 395/200 |
| 5,175,691 | 12/1992 | Balcer et al. | 364/478 |
| 5,179,329 | 1/1993 | Nishikawa et al. | 395/83 |
| 5,198,737 | 3/1993 | Harima et al. | 395/82 |
| 5,208,899 | 5/1993 | Wheeler et al. | 395/62 |
| 5,210,821 | 5/1993 | Yazaki et al. | 395/83 |
| 5,227,707 | 7/1993 | Mitomi et al. | 395/83 |

Primary Examiner—Alyssa H. Bowler
Assistant Examiner—Daniel H. Pan
Attorney, Agent, or Firm—Peter A. Taucher; David L. Kuhn

[57] ABSTRACT

The method for routing communications is designed for a particular set of entities including at least one robotic vehicle and a control center governing the vehicle. The method includes the construction of variable length informational transmissions whose components are arranged in a fixed order. The transmissions are modularly formatted so as to be compatible with a universal OSI-RM communication model.

1 Claim, 4 Drawing Sheets

| FIELD | THROTTLE | STEER | HEADLIGHTS | FUEL LEVEL |
|---|---|---|---|---|
| BLOCK NAME (32) | POWER PLANT | STEERING | LIGHTS | FUEL |
| BLOCK ADDRESS (34) | 02H | 04H | 10H | 12H |
| UNIT NAME | MAIN ENGINE | STEERING | LOW BEAMS | TANK A |
| UNIT I.D. (18) | 01H | 01H | 02H | 01H |
| SEQUENCE NUMBER (14) | 5H | 2H | AH | 4H |
| TRANSACTION DISPOSITION (16) | 0H | 0H | 0H | 0H |
| TRANSACTION CATEGORY | 02H | 02H | 02H | 03H |
| TRANSACTION ATTRIBUTE | THROTTLE | SETTING | STATE | LEVEL GAUGE |
| ATTRIBUTE IDENTIFIER (10) | 06H | 02H | 02H | 02H |
| PARAMETER (11) | FFH (FULL) | 00H (STRAIGHT) | 01H | NA |

Fig. 5

COMMUNICATION METHOD FOR CONTROLLING AND MONITORING ROBOTIC ENTITIES

BACKGROUND

In modern warfare one of the hazards encountered is nuclear, biological or chemical contamination of the battlefield. This has motivated research into the use of robotic military vehicles to perform such tasks as surveillance, environmental testing or even fighting in potentially contaminated areas. In addition, research has been done in the use of robotic vehicles to perform such inherently dangerous military tasks as clearing mine fields.

A number of systems by which a control center communicates with and governs robotic vehicles have been developed in recent years. The hardware, software and data transmission format of any one of these systems is typically incompatible with any of the other systems. This incompatibility increases the risk that the operation of different vehicles can not be coordinated. Further, there is a duplication of effort in the design and upgrading of these communication systems.

BACKGROUND ELEMENTS OF THE OSI-RM MODEL

Figure 3:
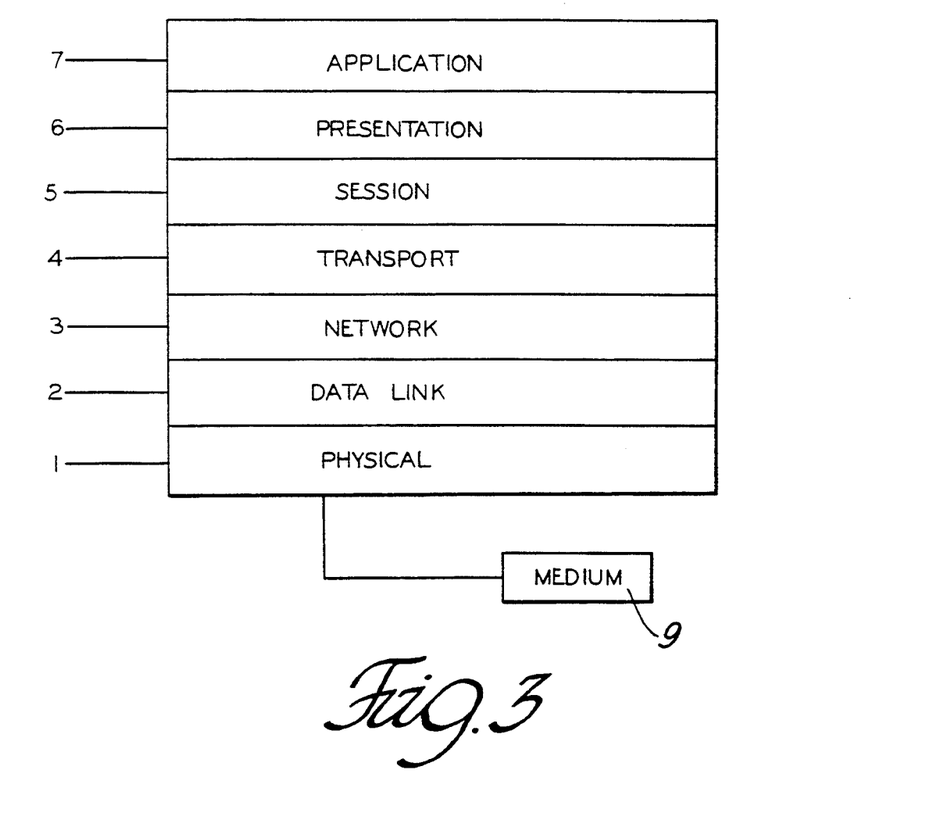
FIG. 3 depicts the Open Systems Interconnection Reference Model.

In 1978 a communication architecture model, the OSI-RM, was developed which was a step towards creating interoperability and standardization of communication systems for robotic vehicles. The OSI-RM was developed by the International Organization for Standards (OSI) in 1978 to promote compatibility among a wide variety of digital communication systems. While the OSI-RM is not a communication protocol or even a standard for such a protocol, it does define the communication process as having seven layers, 1 through 7, as shown in FIG. 3. There can be sublayers within each layer and it is thus possible for several communication protocols to exist at each layer. It is also necessary for the layers and sublayers to communicate with one another.

Physical Layer

The bottom or physical layer 1 interfaces with the medium 9, which can be air, twisted pair cable, coaxial cable, fiber optic cable, water or laser. It is the responsibility of the physical layer to send and receive information bits over the medium. The physical layer is concerned with the following functions: adapting the communication system hardware and software to the medium; encoding the data for the channel of the medium over which the data will be sent; sequencing the events in the physical layer that are used in data transmission; modulating and demodulating signals.

Data Link Layer

Figure 4:
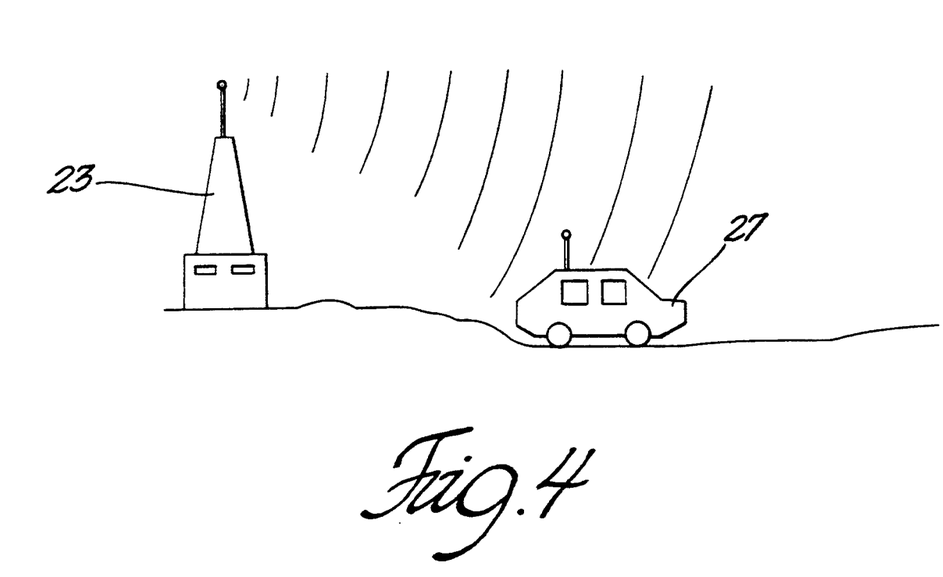
FIG. 4 shows a control center and a robotic vehicle.

Data link layer 2 concerns itself, with the point-to-point communication link established between different entities in the medium. This could be, for example, a radio link over the air between a command post 23 and a robotic vehicle 27 as shown in FIG. 4. The data link layer performs the following functions: link management, which involves the activation, maintenance and deactivation of the link; error control, which involves bit error detection and correction; flow control, which keeps a fast sender from overwhelming a slow receiver; synchronization, which is the ordering of the various components of a discrete message or other communication unit and the causing of a receiver to recognize the beginning, end and intermediate portions of the communication unit; and addressing, which identifies the sender or the receiver of a communication.

In the course of its work, data link layer 2 in a sender entity arranges data into frames or blocks and adds overhead bits which are used to perform the above functions. The completed frames or blocks are passed down to the physical layer for transmission. The link management layer of a receiver entity will use the overhead bits for such things as routing the communicated data to the appropriate network member of the receiving entity.

Network Layer

Network layer 3 routes data through a network comprised of units such as computers or terminals. For the present at least, it is contemplated that robotic vehicles and their control centers will be in direct, one-on-one communication with one another with no lateral communications from vehicle to vehicle or from control center to control center. Therefore the communication protocol that is presented here does not include a networking function. However, the protocol can have a networking function added if this function becomes desirable for controlling robotic vehicles. Additionally, the protocol presented here is usable by a single control center in one-on-one communication with a plurality of robotic vehicles.

Transport Layer

The basic function of transport layer 4 is to provide services for end-to-end communications. Before proceeding further, it will perhaps be helpful to clarify the distinctions among point-to-point communications, end-to-end communication and network communication as those terms are used here. As noted before, point-to-point communication is exemplified by communication between control center 23 and robotic vehicle 27. Network communication would be lateral communication, as between two robotic vehicles. End-to-end communication would be exemplified by a component of the command center communicating with a component of the robotic vehicle. This would be more specifically exemplified by an engine control software package in the control center's computer issuing an acceleration command to the throttle control software/hardware aboard the vehicle. It can be seen that a point-to-point communication occurs in the middle of every end-to-end communication.

The transport layer performs the following functions: connection survival, which involves the activation, maintenance and deactivation of the end-to-end connection; error control, which involves bit error detection and correction; flow control, which keeps a fast sender from overwhelming a slow receiver; sequencing, which is the numbering or otherwise uniquely identifying various messages generated by a sender; and expediting (or "expedited delivery"), which is the recognition of higher priority messages and giving them faster, expedited processing. The transport data layer adds overhead bits to messages and the overhead bits are used to perform functions of the transport layer.

Session Layer

The session layer is the fifth layer of the OSI-RM protocol. This layer controls the dialogue between application software of one communicating entity, such as control center 23, and application software of a second communicating entity, such as robotic vehicle 27. This layer: (1) establishes and terminates connections between the application software of one entity and another; (2) allows either abrupt or graceful disconnections (determines whether a message can be interrupted during a transmission and what to do if interruption occurs); (3) determines whether the dialogue will be conducted in full duplex mode, half duplex mode or simplex mode.

Presentation Layer

The presentation layer resolves differences in format and data representation between an incoming message and the system receiving the message. Other functions of this layer include security through encryption, message compression, and syntax conversion.

Application Layer

The application layer 7 interfaces with applications software or human operators performing the logic or action of a of a communicating entity. For example, the application layer could translate a string of binary bits representing a sender's message into a verbal representation usable by a monitor screen viewed by a human operator at a control center. As another example, the application layer on a robotic vehicle could transform a command in binary bit form into signals that control motors used to move the vehicle's cameras. For outgoing end-to-end communications, the application layer determines the appropriate destination for the message. For example, the application layer would insure that a "stop vehicle" command by a human operator at control station 23 would result in an appropriate message to the brake actuation mechanism of vehicle 27. For incoming end-to-end communications, the application layer interprets codes or signals.

Further Developments Using the OSI-RM by the United States Army Tank-Automotive Command (TACOM)

The matter discussed in this section of the application is further development using the OSI-RM done at TACOM and this matter is not part of the applicant's invention. However the applicant's invention is designed to work in the context of the OSI-RM as adapted by TACOM. For clarity and ease in understanding the invention, TACOM's adaptations to the OSI-RM are discussed here.

Data Link Layer

To perform the functions of the data link layer, overhead bits are added to the data bits (the information to be transferred) and these bits are arranged into frames. An optimum frame format is one which can effectively perform the needed functions with a minimum of overhead bits. Assuming a constant bandwidth, the amount of data that can be transmitted decreases as overhead increases. The functions determined by TACOM to be necessary at the data link layer for robotic vehicle systems are: (1) synchronization; (2) vehicle addressing; and (3) error control. Synchronization refers to the ability of the receiving entity to determine when a signal being transferred to it starts and ends. This usually done by using some type of flag. Vehicle addressing refers to the ability of a control station to route information to the appropriate robotic vehicle, and vice versa. Error control is the ability of the receiving entity to detect and either correct or disregard data that has been corrupted. For current TACOM robotics programs, a modified version of the Synchronous Data Link Control (SLDC) protocol is used. This protocol is exemplified by transmission block 42 of FIG. 1.

Transport Layer

The TACOM robotic systems are currently dealing with a direct data link between a control station 23 (FIG. 4) and a robotic vehicle 27 (FIG. 4). Therefore, some of the transport layer services contemplated by the OSI-RM are not needed. However the TACOM version of the transport layer does provide sequencing services, expediting (or expedited delivery) services, and connection survival services, all of which have been discussed previously. TACOM's transport layer organizes outgoing data into transport protocol data units, or TPDUs and orders the TPDUs in a desired sequence according to rules in the hardware or software controlling the transport layer. The transport layer adds overhead bits to the TPDUs that indicate the position of each TDPU in the sequence of TPDUs and the priority of each TPDU. The overhead consists of a one byte sequence number that uniquely identifies the TPDU. This sequence number is referenced in communications acknowledging receipt of a particular TPDU. Also, a one byte "data unit code" is added as overhead and is used to identify the TPDU's type and to identify the priority assigned to the TPDU.

TACOM's transport layer uses three basic kinds of TPDUs: information packets, acknowledgment packets and blank packets. There are several kinds of information packets. A normal data (ND) packet has the lowest priority and will be sent when no higher priority packets are waiting to be sent. A normal data packet that requires acknowledgment is designated NA rather than ND. An expedited data (ED) packet has the middle priority and will be sent before ND packets but after the highest priority packet. Express data (XD) packets have the highest priority and will be sent before ND and ED packets. Expedited data packets and express data packets requiring acknowledgment are designated EA and XA respectively.

TPDUs that acknowledge normal data, expedited data, and express data are encoded or designated as ACK, ECK and XCK respectively. Blank packets have their own designation code and are used when no data needs to be transmitted between communicating entities but the data link between them needs to be maintained.

Each packet is numbered sequentially with a one byte number, so that 256 TDPUs can be numbered before starting over. The sequence number is used to acknowledge TDPUs that require acknowledgments. Each information packet has a two-byte header followed by a data field of unlimited length. A acknowledgment packet has a total length of three bytes, the two-byte header and the sequence number of the received information packet to be acknowledged. A blank packet consists of only the two-byte header.

Session Layer

The one-to-one communication between control station 23 and robotic vehicle 27 is simpler than the communication among several entities contemplated by the OSI-RM, where one point can communicate with more than one other point. Hence, for one-to-one communication the session layer can be smaller than when three or more points of communication are involved. Also, to maintain effective, real-time control of vehicle 27, signals generated by the vehicle and control station 23 must be relayed as soon as they are available for transmission. Hence, full duplex communication is preferred.

It is also preferred that abrupt, as opposed to graceful, connections be utilized. The use for graceful disconnections occurs between systems exchanging large amounts of data such as file transfers, where typically no time limit for transmissions is imposed. Contrastingly, robotic vehicle control needs quick, frequent, short messages where time spent on making a disconnection graceful will undesirably delay transmissions.

SUMMARY OF THE INVENTION

Within the context of the OSI-RM model, my invention is a protocol for the application layer, denoted at 7 in FIG. 3. Layers 1 through 6 of the OSI-RM model are not part of my invention but are described here for the sake of completeness of background information. It should be noted that the description herein of layers 1 through 6 is only one of many possible examples of how these layers can be structured when my protocol for layer 7 is used.

My application layer protocol will contain a compilation of messages which can be transmitted between a control center and a robotic vehicle and will contain logic to formulate a code for each of the complied messages, as well logic for translating these codes.

DETAILED DESCRIPTION OF THE INVENTION

Block Address and Unit Identification

My protocol uses several data bases during its operation, the first of which is a list of all possible devices on the various vehicle types that are to be controlled. Within the list, devices are logically grouped together so that all cameras, for example, will be at the same block address. Each of the block addresses is assigned a block address code and each device within a block is assigned a unit identification code. The block address code will be at block address 32 in FIG. 1 and the unit identification code will be at 34 in FIG. 1. In my protocol, the block address code and the unit identification code together form a destination code used in routing messages to a particular device on the vehicle. When the vehicle is sending a message, the destination code becomes the source code identifying the device from which the message comes.

Attribute Identifiers

For each device, all the device's attributes are to be controlled are defined. Every attribute is assigned a code and this code is used as an attribute identifier. In the case of vehicle cameras, for example, the zoom, iris size, and camera direction are attributes to be managed from a control center remote from the vehicle. For each attribute, the range of possible values for the attribute are defined or listed in a parameter field or block associated with the attribute. For example, all the possible sizes for the iris will be listed in a parameter table associated with the camera's iris size attribute. Where appropriate, the parameter table will have a designated alarm value or values. Thus if the temperature attribute of a device such as the vehicle engine exceeds a certain value, an alarm message will automatically be sent to the control center. The parameter can also be a condition, such as "on" or "off."

Structure of Transition Block

Figure 1:
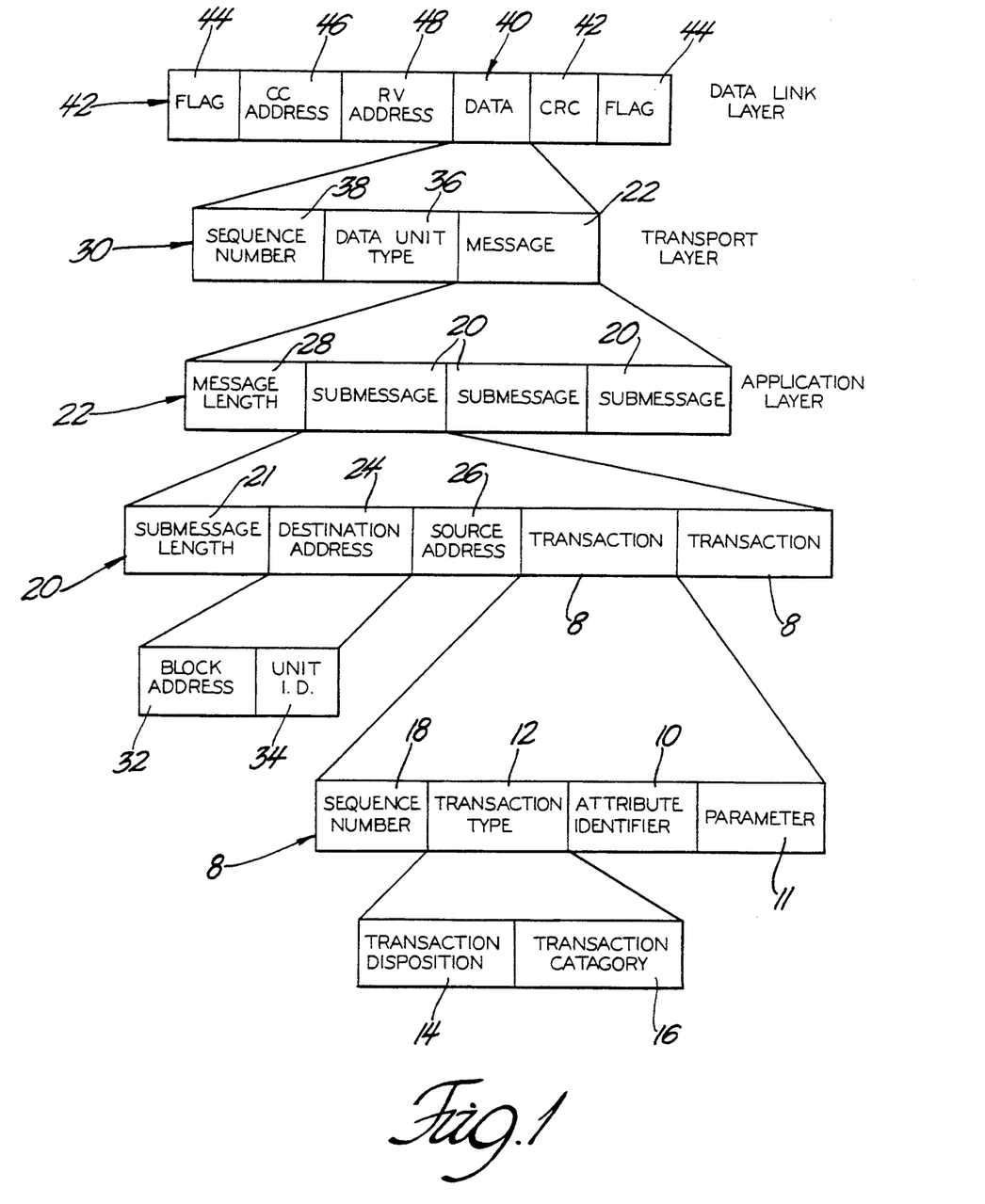
FIG. 1 is the structure of a digital message constructed in accordance with my protocol.

FIG. 1 is a the structure or arrangement of a digital communication between a control center 23 and a robotic vehicle 27 as that communication would exist in a buffer or other physical memory component of the control center or the robotic vehicle during the communication process. As seen in FIG. 1, the the attribute identifier 10 and the associated parameter block 11 are components of a larger transaction block 8. Referring back to a previous example, the attribute identifier 10 could be associated with camera iris size and parameter block 11 would then have a value for this iris size.

The transaction block 8 also contains a "transaction type" subblock 12 which tells the receiver (a device on the vehicle or the control center) of the transaction block how information in this block is to be treated. The "transaction type" subblock is itself comprised of a "transaction disposition" block 14 and a "transaction category" block 16.

Again turning to FIG. 1, one can see that the transaction fields or blocks 8 each contain, in order, a sequence number block 18, a transaction type block 12, an attribute identifier block 10, and a parameter block 11. Sequence number block 18 contains a number that is generated for each outgoing transaction and the receiver of the transaction uses this sequence number when responding to the transaction. Blocks 10, 12, 14 16 and 18 are fixed length blocks preferably having, respectively, 8 bits, 2 bits, 4 bits, 8 bits, and 4 bits of information.

Transaction Disposition Block

Transaction disposition block 14 is a four bit block that will contain one of five codes that represent the possible transaction statuses of my protocol. The first status is the "initiating" status, which indicates that the transaction is starting a communicative exchange, not responding to a previous message. The second status is the "command received" status, which shows that the transaction is an acknowledge of a previously sent message. The third status is a "command executed" status, which indicates that the transaction's purpose is to report accomplishment of a previously received command. The fourth status is a "command unknown" status, which shows the transaction is an acknowledgment of a command and shows that the command was not recognized. Within the four-bit block for "command unknown" status is a two-bit block indicating which of the following parts of the acknowledged command is not recognized: block address 32, unit identification 34, transaction type 12, attribute identification 10, or parameter 11. The fifth status is the "command execution failed" status, which shows that the transaction acknowledges a previous, recognized command that can not be executed. For purposes of the sample communication that will be discussed later, the hexadecimal value of the code chosen for each of the transaction dispositions are as follows:

| Initiating | 0 |
|---|---|
| Command Received | 1 |
| Command Executed | 2 |
| Command Unknown | 3 |
| Command Execution Failed | 4 |

As noted above, it is possible to have a subblock within the "command unknown" indicator to specify what part of the command is unknown, as by the following hexadecimal value for codes

| Block Address | 0 |
|---|---|
| Unit ID | 1 |
| Transaction Type | 2 |
| Attribute | 3 |
| Value Out of Range | 4 |

Likewise, it is possible to have a subblock within the "command execution failed" indicator to specify what part of the command has failed, as by the following hexadecimal values for codes:

| Parameter Too High | 1 |
|---|---|
| Parameter Too Low | 2 |
| Parameter Currently Invalid | 3 |
| Unknown Reason | FF |

Transaction Category Block

Transaction category block 16 is an eight-bit block further describing the general subject matter of the transaction. The first possible description in this block is "control with acknowledgment", which indicates that the transaction is a control command that needs to be acknowledged as received or completed by the receiver. This description is used for important one-time commands such as gun firing or gear changing. The next possible description is "control with no acknowledgement," which is the same as the first description except that acknowledgment is not needed. A "status request" description is used when the transaction is a one-time request about one of the parameters monitored by the control center, such as ammunition level. A "periodic status request" transaction description is the same as a "status request" transaction description except that the former requires periodic updating at prescribed intervals. A "query control" description is used when the transaction's purpose is to determine whether a command directed to a particular combination of destination address and attribute is available. The "query alarm limits" and "set alarm limits" are used when the transaction seeks, respectively, to inquire about and set the value for given parameters that will cause an alarm signal. Likewise, the "query operating limits" and "set operating limits" descriptions are used when the transaction seeks, respectively, to inquire about and set the value for given parameters that define the operating limits for a particular device attribute. The "indication with acknowledgement" description is used in the case of a transaction that gives unsolicited status information and acknowledgement is required.

An "alarm activated" and an "alarm retired" description are used respectively for transactions where an alarm condition begins or an alarm condition ends.

Again, for the purpose of the example to follow, the hexadecimal codes for the transaction category are:

| Control w/ack | 1 |
|---|---|
| Control no ack | 2 |
| Status Request | 3 |
| Periodic Status Request | 4 |
| Query control | 5 |
| Set alarm Limits | 6 |
| Query alarm Limits | 7 |
| Set Operating Limits | 8 |
| Query Operating Limits | 9 |
| Indication w/ack | A |
| Alarm Activated | B |
| Alarm Retired | C |
| Command Execution Indication | D |
| Command Execution Failed | E |
| Indication no ack | F |

Submessage Block Structure

One or more transaction blocks 8 form the rear or trailing end of a submessage block 20 that also includes a submessage length block 21, a destination address block 24 and a source address block 26. Destination address block 24 is comprised of a "block address" block 32 and a "unit identification" block 34, both of which have a constant length of 8 bits. Consistent with the OSI-RM model, all devices of a similar nature on a vehicle will be members of a set having a common block address, as at 32. Within a set each device will have a separate unit identification, as at 34. For example, all cameras on a vehicle will have a common block address but the right front infrared camera would have a different unit identification number than, say the rear visible-spectrum camera. For multiple vehicles, corresponding devices will have the same address code and will react to transactions in the same way.

Source address 26 is structured the same way as is the destination address. For the present, it is contemplated that only a single code will be necessary to designate control center 27 (FIG. 4) and this code will occupy the destination address 24 or source address 26 as appropriate. It is contemplated that in the future, control center 27 may be subdivided into discrete logic units or that several control centers may be networked together. In this event, the various control centers and their subcomponents will be assigned different address codes. When an incoming message requiring an acknowledgement is received, the responding acknowledgment message uses the incoming message's source code as the destination code. Likewise, the responding acknowledgement message uses the incoming message's destination code as a source code. This guarantees that the module initiating the communication will properly get the acknowledgement.

At the beginning of submessage block 20 is a fixed-length, eight-bit "submessage length" block 21. This block contains a count of all the bits in the submessage block, including the bits in the submessage block itself. Destination address block 24 and source address block 26 are also fixed in length, each having 16 bits. All submessage blocks 20 will have the same kind of subcomponent blocks as shown in FIG. 1 and the subcomponent blocks in each submessage block will be ordered the same way, preferably the order shown in FIG. 1.

Structure of Message Block

One or more of submessage blocks 20 form the trailing end of a message block 22. At the beginning of message block 22 is a fixed-length, eight-bit "message length" block 21. This block contains a count of all the bits in the message block, including the bits in the message block itself. The application layer of the communication system receiving a transmission disassembles the message blocks and uses the destination address blocks to route the submessages to the appropriate device within the vehicle.

Structural Relation of my Application Layer to Transport and Data Link Layers As stated previously, my invention is a protocol for the the application layer of the overall OSI-RM model. What follows is a description of a transport layer and a data link layer that can overlay my application layer in a manner consistent with the model.

Addition of the Transport Layer

One or more message blocks 22 associated with the application layer form the trailing end of transport data unit or TDPU 30, which is associated with the transport layer. TDPU 30 also contains a fixed length "data unit type" block 36 and a fixed length "sequence number" block 38. As discussed previously, the transport layer organizes outgoing data (as formed into submessages) into TPDUs and orders the TPDUs in a desired sequence according to rules in the hardware or software controlling the transport layer. The appropriate one-byte sequence number is then added to block 38. The transport layer also adds overhead bits to the "data unit type" block that indicate the type and priority of each TPDU. The various kinds and priorities of TDPUs have been discussed previously.

Addition of the Data Link Layer

TPDU 30 is represented as data block 40 within the complete transmission 42, which also contains flag blocks 44, CRC block 42, CC address block 46 and RV address block 48. The CRC block is a block containing data bits used for error control, and can contain, for example, a value representing the total number of bits of data in the transmission before the transmission is sent. This value can be compared by the receiver with an actual bit count it makes upon receipt of the transmission. The CRC block is preferably a fixed length block of sixteen bits.

RV address block 48 is a fixed-length 5-bit block having a code representing the robotic vehicle involved in a point-to-point communication and CC address block 46 is a 3-bit fixed-length block having a code representing a control center involved in the point-to-point communication. The relative positions of RV address block 48 and CC address block 46 can depend on whether the communication is being sent from the vehicle to the control center or from the control center to the vehicle. For example, in communications from the control center to the vehicle, the CC address block would immediately precede the RV address block whereas the RV address block would precede the CC address block in communications from the vehicle to the control center. The flag blocks 44 are fixed-length 8-bit blocks at either end of transmission 42, the flags blocks having codes that signify the beginning and end of a given transmission.

Steps of Building a Digital Message

Formation of Transaction Block

Figure 2:
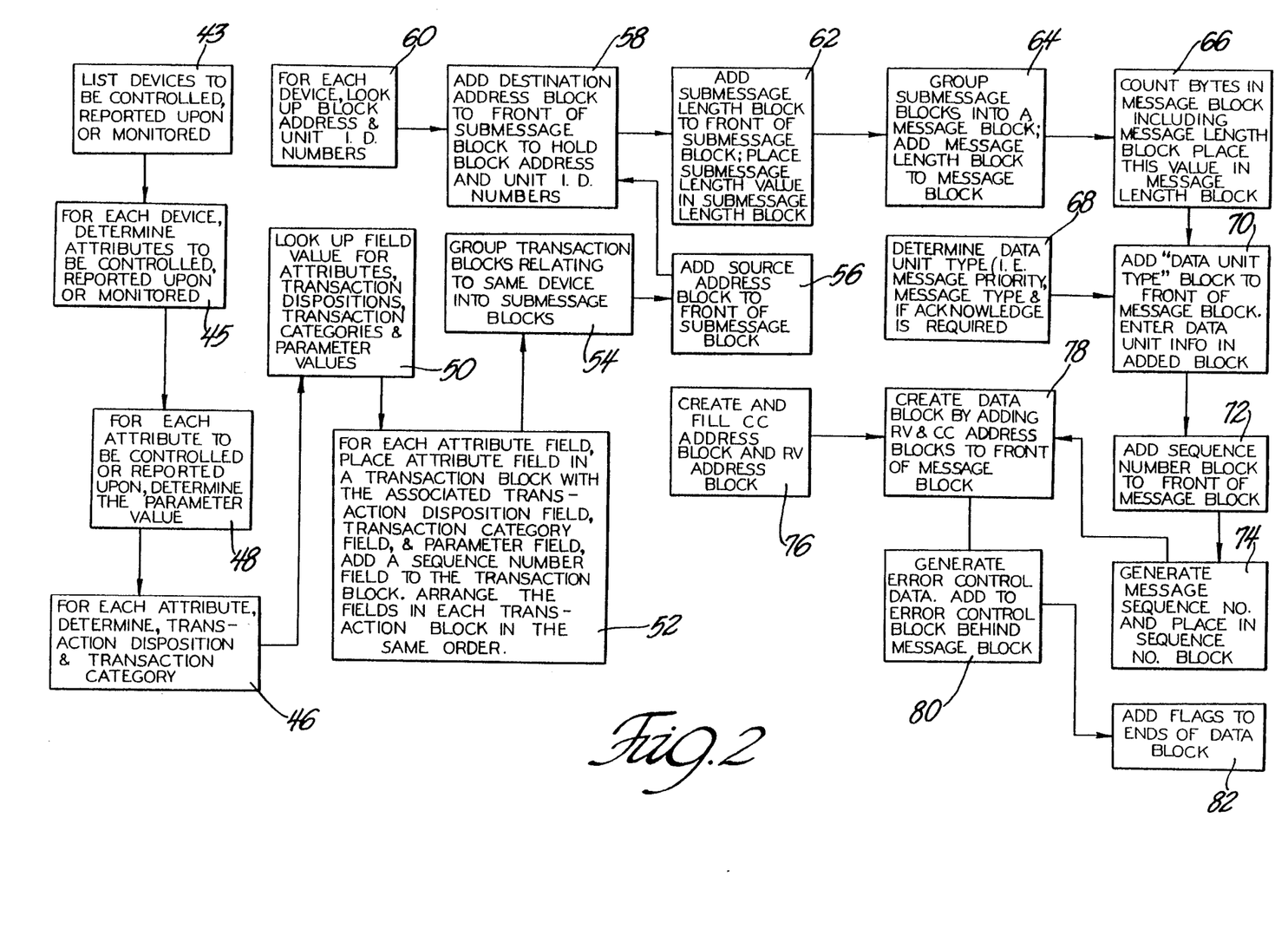
FIG. 2 is a flow chart depicting the method by which the digital message of FIG. 1 is constructed.

FIG. 2 is a flow chart outlining the steps by which data transmission 42 depicted in FIG. 1 is constructed. The initial step 43 is to determine what devices are to be controlled, monitored or reported upon. The next step 45 requires a decision as to and which attributes of the chosen devices will be the subject of the transmission. Steps 46 and 48 can now be accomplished. Step 46 is the determination (for each attribute) of a transaction disposition and a transaction category. Step 48 is the determination, for each attribute, of the parameter value to be communicated. Step 50 is to look up or generate codes for the attributes, transaction dispositions, transaction categories and parameter values obtained in previous steps.

Step 52 is the actual assembly of transaction block 8. Each attribute code is placed in the transaction block along with the associated transaction disposition code, transaction category code, and parameter code. A sequence number code is added to block 18 in transaction block 8. The codes and component blocks containing them (blocks 10, 11, 12, 14, 16, and 18) are arranged in the same order in every transaction block 8. Transaction blocks 8 that relate to the same device are then grouped into submessage blocks 20 during step 54 and source address blocks 26 are added to the front of the submessage blocks during step 56.

Formation of Submessage and Message Blocks

During step 58 the destination address block 24 is placed ahead of the source address block 26, the block address codes and unit identification codes having been looked up previously and placed respectively in "block address" block 32 and unit identification block 34. The assembly of the submessage blocks 20 is completed in step 62 wherein the length, in bits, of the submessages is determined and the value representing the length of each submessage is placed in a submessage length block 21 at the leading end of the submessage block 20.

Now message blocks 22 are assembled. This is accomplished by first arranging all of submessage blocks 20 end to end, the leading end of a given submessage block being next to the trailing end of the preceding message block. Next the 8-bit message length block 28 is added to the front of the assembled submessage blocks and a count of the total number of bytes in the resulting message block is made. This byte value includes one byte for message length block 28 itself and this value is entered into the message length block 28. The assembly of message blocks 22 is shown as steps 64 and 66 in FIG. 2.

Formation of TDPU

The next process is to build upon the message block to transform it into a transport data unit, or TPDU, 30. This process is shown as steps 68, 70, 72 and 74 in FIG. 2. The transport layer of the software or hardware responsible for generating communications will generate a one byte "data unit code", which is placed in "data unit type" block 36 immediately ahead of message block 22. The data unit code is used to identify the TPDU's type and identify the priority assigned to the TPDU. These types and priorities have been previously described.

Also as discussed previously, the transport layer organizes outgoing data into one or more TPDUs and orders the TPDUs in a desired sequence according to rules in the hardware or software controlling the transport layer. The transport layer adds overhead bits to the TPDUs that indicate the position of each TDPU in the sequence of TPDUs and the priority of each TPDU relative to the other TPDUs with which it is grouped. These overhead bits also constitute a sequence number that uniquely identifies the TPDU. These bits are placed in sequence number block 38, which immediately precedes the data unit type block 36.

Completion of Digital Message

The final basic step is to build the transmission blocks 42, using the TPDUs as bases or kernels, this basic step being shown as comprising smaller steps 76, 78, 80 and 82 in FIG. 2. The transmission blocks are the units that are actually transmitted over medium 9 (FIG. 3) during communication between the control center 23 and robotic vehicle 27. During step 76, CC address block 46 and RV address block 48 are created and the appropriate address codes are entered into these blocks to respectively represent the point-to-point communication addresses of the control center and the robotic vehicle. In step 78, Blocks 46 and 48 (FIG. 1) are added to the front of TPDU 30. In step 80, transmission error control data is generated by the data link layer of the communication hardware or software, and this data is entered into CRC block 43, which is placed immediately behind TPDU block 40. Finally, in step 82, flag blocks 44 are added to either end of the transmission block and a flag code is placed in each of these flag blocks. These codes are used in the point-to-point communications between the control center 23 and the robotic vehicle 27 to mark the beginning and end of an individual transmission.

MESSAGE INTERACTIONS

As has been explained above, one of the components of a given communication is a transaction. As previously noted in the paragraph entitled "Transaction Disposition Block", one of the statuses a transaction can have is the "initiating" status, which means that the transaction is starting a communicative exchange and is not responding to a previous transaction. The purpose of this part of the application is to list and explain the the various "initiating" transaction and to explain the "responding" transactions that can react to each initiating transaction. The paragraphs that follow each explain a given initiating transaction and the possible responses to it.

A. Control with Acknowledgment

This transaction type is used to command some function be performed, and requests a report on the actual performance. After sending the message, the sender will set up a timer. Within a certain time, if no responding transaction returns, the timer will time out and the same command will be tried n times. If after n tries there is still no response, the timed-out situation will be reported to the application software which, in turn, may report it to the operator. If the command is received at the destination, it can be answered by one of the following responses:

- Command Received: Normally, if a command cannot be completed within 0.5 seconds, a Command Received response will be sent first. Later when the execution finishes, the Command Execution Indication or Command Failed Indication will be sent.
- Command Executed: If a command can be executed within 0.5 seconds, it can send back the Command Executed transaction, which implies that the command has been received and then executed.
- Command Unknown: If one or more of the Block Address, the Unit ID, the Transaction Type, or the Attribute is unknown, the response will be the Command Unknown transaction disposition. The parameter field will describe exactly which field is unknown as discussed previously.
- Command Execution Failed: If the receiving system is unable to execute a command it received, the Command Execution Failed response will be sent.

B. Control no Acknowledgment

This message commands some function to be performed, but does not require any acknowledgment. After this message is sent out, no response is expected unless the command cannot be executed, or if it is unknown. For example, during teleoperation, if a vehicle operator pushes a brake pedal at control station 23, the brake commands will be sent to vehicle 27 using "Control No Acknowledgment" transactions. The operator gets direct feedback by seeing the vehicle slowing down. The following are the only possible responses:

Command Unknown
Command Execution Failed

C. Status Request

If no response is returned from the vehicle 27 within a certain time, the message will be retried n times (n to be determined). If after n tries no response is returned, the time out situation will be reported to the application software and possibly to the operator. The following are the possible responses:

Command Executed
Command Unknown
Command Execution Failed

D. Periodic Status Request

This transaction type asks for a report on the status of a device or module on a periodic basis. The first acknowledgment returned indicates a mechanism has been set up to report the requested status periodically. If no Command Executed response is returned within a certain time, the request will be made n more times. If no response is returned after n tries, the timed-out situation will be reported to the application software and possibly to the operator. If the Periodic Status Request is executed successfully, the vehicle 27 will continue to send the desired information at the requested rate until it receives a cancellation command. A command with the update rate set to zero is a cancellation command. The following are the possible responses:

Command Executed
Command Unknown
Command Execution Failed

Note that a message which periodically returns requested status information will have a "Command Executed" transaction disposition, a "Periodic Status Request" transaction category, and a sequence number identical to the message which initially requested the periodic status.

E. Query Control

This transaction type can be used to verify that an attribute is modifiable or to verify that the function exists. Otherwise this transaction type causes no action.

If no response is returned within a certain time, the message will be sent n times before it gives up. If there is no response returned after n tries, the timeout situation will be reported to the application software and possibly to the operator. The following are the possible responses:
Command Executed
Command Unknown
Command Execution Failed

F. Set Alarm Limits

This transaction type sets the upper and lower limits for alarms. The parameter field contains the limits. If no response is returned within a certain time, the message will be sent n times. If there is no response returned after n tries, the timed-out situation will be reported to the application software and possibly to the operator. The following are the possible responses:
Command Executed
Command Unknown
Command Execution Failed

G. Query Alarm Limits

This transaction type asks for a report on the actual alarm limits as set or, if no limits have been set, the allowed range of the attribute. If no response is returned within a certain time, the message will be sent n times. If there is no response returned after n tries, the timed-out situation will be reported to the application software, and possibly to the operator. The following are the possible responses:
Command Executed
Command Unknown
Command Execution Failed

H. Set Operation Limits

This transaction type sets the upper and lower limits of an operating parameter. If no response is returned within a certain time, the message will be sent n times. If there is no response returned after n tries, the timed-out situation will be reported to the application software and possibly to the operator. The following are the possible responses:
Command Executed
Command Unknown
Command Execution Failed

I. Query Operating Limits

This transaction type asks for a report on the actual operating limits or, if no limits have been set, the range limits of the attribute. If no response is returned within a certain time, the message will be sent n times. If there is no response returned after n tries, the timed-out situation will be reported to the application software and possibly to the operator. The following are the possible responses:
Command Executed
Command Unknown
Command Execution Failed

J. Indication

The indication message is sent to declare that some status has changed. The message will be continually sent until an acknowledgment is received. The possible responses are:
Command Received: The transaction is returned with the Transaction Disposition changed, and without any parameter.
Command Unknown Note that a message which periodically returns status information that has not been requested will have an "Initiating" transaction disposition, an "Indication" transaction category, and a sequence number randomly chosen.

K. Alarm Activated

An alarm message is sent when some critical condition is present. The message will be continually sent until an acknowledgment is received. The following response are possible:
Command Received: The transaction is returned with the Transaction Disposition changed, and without any parameter.
Command Unknown

L. Alarm Retired

This message is sent to declare that the previously reported critical condition has returned to normal. This message will be continuously sent until it gets an acknowledgment. The following responses are possible:
Command Received
Command Unknown
Command Execution Indication When a control station sends a command which requires an acknowledgment, vehicle 27 may reply "Command Received." This means that vehicle 27 received the command, but command has not yet been executed. If the command is executed, then the "Command Execution Indication" transaction is sent from the vehicle 27 to the control station. An "Initiating" transaction disposition is used, and the sequence number is identical to the sequence number of the original command requesting action. The following responses are possible:
Command Received
Command Unknown
Command Failed Indication When a control station sends a command which requires an acknowledgement, the vehicle 27 may reply "Command Received." This means that the vehicle 27 received the command, but it has not yet been executed. If the command is not executed, then this transaction, "Command Failed Indication", is sent from the vehicle 27 to the control station. An "Initiating" transaction disposition is used, and the sequence number is identical to the sequence number of the original command requesting action. The only following responses are possible:
Command Received
Command Unknown

Transmission Management Features of the Protocol

In the overall protocol, the relative positions of the various components of digital message 42 are always the same, so that the component's position aids a message receiver in identifying what that component is. Thus when the flag block 44 at the front of digital message alerts a receiver to the beginning of the digital message, the receiver is able to determine the nature of the component blocks that follow with little or no overhead identification information for each of the component blocks. The flag block 44 at the end of the digital message 42 is also helpful. A digital message 42 can vary in length due, for example, to variable numbers of transaction blocks in digital messages 42. Therefore an end flag block is an effective device to prevent entraneous matter from being suffixed to the digital message 42. Keeping a receiver apprised of the beginning and end of a transmission block is part of the synchronization process managed in the data link layer 2 of the OSI-RM model.

Message length block 28 is used by data link layer 2 for the flow control function, wherein data transmitting and data receiving speeds of point-to-point communicating entities are matched to one another. A sending point-to-point communicating entity can, for example, vary the interval between transmissions based on the length of the transmissions and the maximum baud rate at which the receiver can accept data. The receiver's data link layer can also use the message length block 28 for an error control process wherein the length of the message block as received can be compared to the message length value in block 28.

Submessage length block 21 is used by the transport layer 4 in a fashion similar to that in which data link layer 2 uses message length block 28. The difference in functions is that message length block 28 is used for point-to-point communication services whereas submessage block is used for end-to-end communication services. The transport layer could, for example, limit the number of submessage blocks per message block destined for a given device in view of the length of these submessages and the maximum baud rate at which the device can receive data.

It is also noted that CC address block 46 and RV address block 48 are used by the data link layer to identify the "points" (a robotic vehicle 27 or a control center 23) in point-to-point communication services whereas destination address block 24 is used by the application layer 7 to identify the receiving "end" (such as a camera or other device) in end-to-end communication services.

EXAMPLE

The following example is given to further clarify and explain my protocol. Assume that personnel in a command center (Command Center #1 for this example) wish to remotely drive a vehicle (RV #3 for this example). Assume also that these personnel want to turn on the vehicle's headlights and want to know how much fuel remains in the fuel tank.

Figure 5:
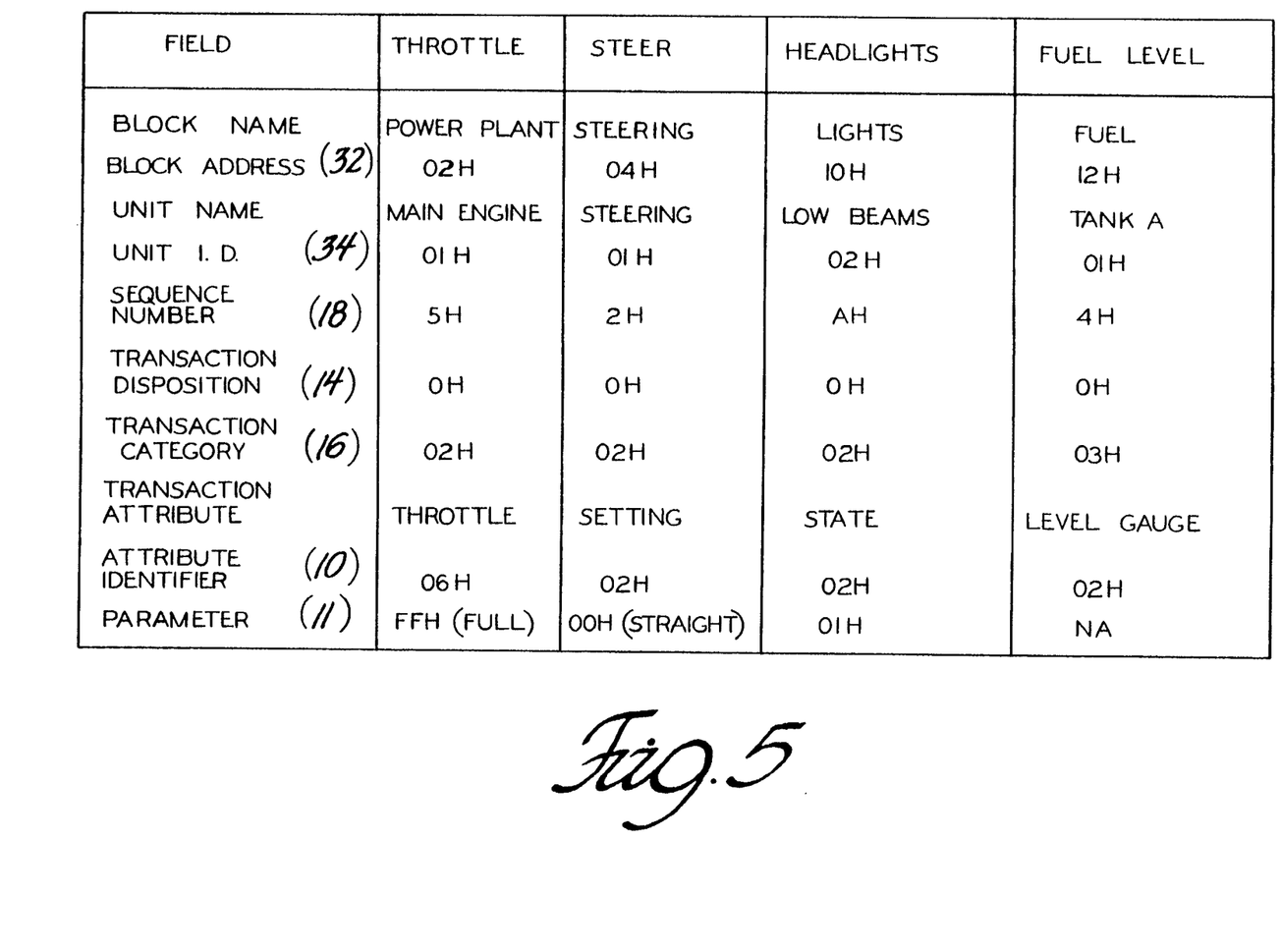
FIG. 5 shows a table of determined values of element numbers from FIG. 1.

Following the method shown in FIG. 2 and the accompanying text, values for the block address, unit ID, sequence number, transaction disposition code, transaction category code, attribute identifier and parameter are determined. Note the correspondence with elements of FIG. 1: block address 32, unit ID 34, sequence number 18, transaction disposition 14, transaction category 16 attribute identifier 10 and parameter 11. The determined values are shown in hexadecimal form in the table at FIG. 5, the appropriate element numbers from FIG. 1 being in parentheses after the labels in the "Field" column of the table.

After obtaining the values on the chart, group the commands as submessages, as at step 54 in FIG. 1. Since each command has a different Block Address and Unit ID, each command is a separate submessage. Next determine the values for the Submessage Length fields. All four commands have seven fields: submessage length, block address, unit ID, source address, sequence number, transaction type, and attribute. These seven fields each occupy eight bytes. In addition, the throttle, steering and low beam light commands each have a one-byte parameter field. The submessage length values, in hexadecimal form for the number of bytes, are:

| | |
|---|---|
| Throttle | 09 |
| Low beam light | 09 |
| Steering | 09 |
| Fuel status | 08 |

The last value to be determined is the message length. This is simply the sum of the submessage length values, plus one for the Message Length field itself. The hexadecimal value is 09+09+09+08+01=24 (36 in base 10 notation). The complete RVMF portion (i.e., block 22 of FIG. 1) of the message is:

24 09 02 01 xx xx 50 02 0A FF 09 04 01 xx xx 20 02 04 00 09 14 02 xx xx A0 02 05 01 08 06 01 xx xx 40 03 04

Note that xx xx depicts the source address.

The next step is to add the transport layer elements to the RVMF portion (block 22, FIG. 1) of the message, so as to form transport data unit 30 in FIG. 1. In this example, assume that the message is the third message in a series being sent from the command center, that its priority is normal, and that an acknowledgment is required. The binary sequence number is then 0000 0011, and the data unit type is 0000 1000. The hexadecimal representation for the transport elements is then 03 08. This representation would come immediately before the RVMF portion of the message.

The final step is to add the data link elements so that transport data unit 30 becomes transmission block 42 of FIG. 1. Since the control station address (001) is the first three bits of the address block, and the RV address (1110) is the last five bits of the address block, the binary representation of the address block of the protocol is 0010 0011. The CRC error control bytes are computed in hardware and are depicted as cc cc. The start and stop flags are 0011 1110, respectively.

Therefore, the entire overhead for the data link layer of the protocol, as positioned around transport data unit 30 of FIG. 1 and represented in hexadecimal is:

7E 13 [transport data unit 30] cc cc 73.

The entire message can now be represented as:

7E 23 03 08 24 09 02 01 xx xx 50 02 0A FF 09 04 01 xx xx 20 02 04 00 09 14 02 xx xx A0 02 05 01 08 06 01 xx xx 40 03 04 cc cc 73.

I wish it to be understood that I do not desire to be limited to the exact details of method and structure described herein since obvious modifications will occur to those skilled in the relevant arts without departing from the spirit and scope of the following claims.

I claim:

1. A protocol for direct, non-network communication between a robotic vehicle having a plurality of controllable devices and a control center controlling the devices, comprising the steps of:
   a. establishing a database common to the center and the vehicle and representative of controllable devices of the vehicle, the establishing comprising the substeps of:
      (1) assigning a first point-to-point address code to the center and assigning a second point-to-point address code to the vehicle;
      (2) choosing the devices on the vehicle to be controlled by the center; grouping the devices into logical blocks, assigning block address codes to each block; and assigning identification codes to the devices in the blocks;

(3) choosing attributes of the devices to be controlled; assigning attribute codes to the attributes; digitally representing value ranges for the attributes;

(4) develop a set of transaction types, each transaction type including a transaction disposition portion and a transaction category portion; assigning disposition codes to the transaction disposition portions; and assigning category codes to the transaction category portions;

(5) develop transport data unit types and assign data unit type codes to the transport data unit types;

(6) placing various codes in memories at the center and the vehicle; wherein the various codes include the transaction disposition codes, the transaction category codes, the block address codes, the identification codes, the attribute codes and representations of value ranges associated with each attribute code;

b. constructing a transmission comprised of the various codes by;

(1) choosing one of the devices and one of the attributes;

(2) determining a value of the one attribute to be transmitted along with the one attribute;

(3) determining the transaction type for the one attribute;

(4) from one of the memories, obtaining appropriate codes, including an appropriate transaction disposition code, an appropriate transaction category code, an appropriate block address code, an appropriate one of the identification codes, an appropriate attribute code and a representation of the value;

(5) place the appropriate codes in a transaction block; add a sequence number code to the transaction block; arrange the appropriate codes and the sequence number code in a predetermined order in the transaction block;

(6) add a source address to the transmission identifying a sender of the transmission;

(7) add a destination address to the transmission;

(8) add a message length code to the transmission; and keep the transmission as thus far constructed at a constant length;

(9) add an appropriate data unit type code to the transmission;

(10) add a sequence number code to the transmission;

(11) after steps 8, 9 and 10, add the point-to-point address codes to the transmission;

(12) add flags to a front and back of the transmission.

* * * * *